US010793171B2

(12) United States Patent
Nishimura et al.

(10) Patent No.: US 10,793,171 B2
(45) Date of Patent: Oct. 6, 2020

(54) WIRELESS COMMUNICATION FUNCTION-EQUIPPED TEMPERATURE SENSOR UNIT OF RAILCAR BOGIE

(71) Applicant: KAWASAKI JUKOGYO KABUSHIKI KAISHA, Kobe-shi, Hyogo (JP)

(72) Inventors: Takehiro Nishimura, Kobe (JP); Yoshi Sato, Sanda (JP); Masayuki Mitsue, Kobe (JP); Teruhisa Nakaoka, Kakogawa (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 248 days.

(21) Appl. No.: 15/766,878

(22) PCT Filed: Sep. 1, 2016

(86) PCT No.: PCT/JP2016/003989
§ 371 (c)(1),
(2) Date: Apr. 9, 2018

(87) PCT Pub. No.: WO2017/061069
PCT Pub. Date: Apr. 13, 2017

(65) Prior Publication Data
US 2018/0290670 A1    Oct. 11, 2018

(30) Foreign Application Priority Data
Oct. 8, 2015  (JP) ................................. 2015-200002

(51) Int. Cl.
*B61K 9/04* (2006.01)
*B61F 15/20* (2006.01)
(Continued)

(52) U.S. Cl.
CPC ................ *B61K 9/04* (2013.01); *B61F 15/20* (2013.01); *B61L 15/0027* (2013.01);
(Continued)

(58) Field of Classification Search
CPC .. B61F 15/20; B61K 9/04; B61K 9/00; B61K 13/00; B61L 15/0027; B61L 15/0081;
(Continued)

(56) References Cited

U.S. PATENT DOCUMENTS 3,727,045 A * 4/1973 Warren ..................... B61K 9/04
246/169 A
8,244,411 B2 * 8/2012 Baker ................... B61L 15/0027
701/2
(Continued)

FOREIGN PATENT DOCUMENTS

JP   2003-307228 A   10/2003
JP   2015-521275 A   7/2015
WO   2015/100425 A1  7/2015

OTHER PUBLICATIONS

Nov. 29, 2016 Search Report issued in International Patent Application No. PCT/JP2016/003989.

*Primary Examiner* — Mark T Le
(74) *Attorney, Agent, or Firm* — Oliff PLC

(57) ABSTRACT

A wireless communication function-equipped temperature sensor unit includes: a temperature sensor; a wireless communication board including a conversion substrate including a conversion circuit configured to convert an analog temperature signal into a digital temperature signal, the analog temperature signal being output from the temperature sensor, and a wireless communication module mounted on the conversion substrate and configured to transmit the digital temperature signal as a wireless signal.

10 Claims, 6 Drawing Sheets

(51) Int. Cl.
  *G08C 17/02*   (2006.01)
  *F16C 41/00*   (2006.01)
  *G08C 19/00*   (2006.01)
  *G01K 1/02*    (2006.01)
  *G01K 13/08*   (2006.01)
  *B61L 15/00*   (2006.01)
  *G01K 1/14*    (2006.01)

(52) U.S. Cl.
  CPC .......... *B61L 15/0081* (2013.01); *F16C 41/00* (2013.01); *G01K 1/024* (2013.01); *G01K 1/14* (2013.01); *G01K 13/08* (2013.01); *G08C 17/02* (2013.01); *G08C 19/00* (2013.01)

(58) Field of Classification Search
  CPC ..... F16C 41/00; F16C 2233/00; G01K 13/08; G01K 1/024; G01K 1/14; G01K 1/143; G08C 17/02; G08C 19/00
  See application file for complete search history.

(56) References Cited

U.S. PATENT DOCUMENTS

| | | | |
|---|---|---|---|
| 9,835,505 B2* | 12/2017 | Martinetti | ............. G01K 13/08 |
| 2013/0342362 A1 | 12/2013 | Martin | |
| 2015/0160093 A1 | 6/2015 | Hamilton et al. | |
| 2018/0292148 A1* | 10/2018 | Watanabe | ............... B32B 27/36 |

* cited by examiner

WIRELESS COMMUNICATION FUNCTION-EQUIPPED TEMPERATURE SENSOR UNIT OF RAILCAR BOGIE

TECHNICAL FIELD

The present invention relates to a wireless communication function-equipped temperature sensor unit of a railcar bogie.

BACKGROUND ART

PTL 1 discloses a sensor unit (sensor-equipped bearing device) configured to detect, for example, a temperature of a bearing of a railcar. The sensor unit includes: a communication device configured to wirelessly output information regarding the temperature detected by a temperature sensor; and a power supply configured to supply electric power to the communication device. Therefore, it is unnecessary to provide a signal wire and power supply wire extending from the unit to a carbody.

CITATION LIST

Patent Literature

PTL 1: Japanese Laid-Open Patent Application Publication No. 2003-307228

SUMMARY OF INVENTION

Technical Problem

In the railcar bogie, to prevent the sensor unit from being damaged by flying stones and the like, it is desirable to reduce the amount of projection of the sensor unit from an axle box accommodating the bearing. However, if the amount of projection of the sensor unit is simply reduced, an installation area of the sensor unit increases, and the degree of freedom of the attachment of the sensor unit to the axle box deteriorates. It should be noted that in the railcar bogies, the temperature sensor may be attached to a gear box or a motor instead of the axle box.

An object of the present invention is to, in a wireless communication function-equipped temperature sensor unit attached to a box accommodating a rotating body of a railcar bogie, suppress deterioration of the degree of freedom of the attachment of the sensor unit to the box while preventing the sensor unit from being damaged by flying stones and the like.

Solution to Problem

A wireless communication function-equipped temperature sensor unit of a railcar bogie according to one aspect of the present invention is a wireless communication function-equipped temperature sensor unit attached to a box accommodating a rotating body of a railcar bogie, the wireless communication function-equipped temperature sensor unit including: a temperature sensor; a wireless communication board including a conversion substrate including a conversion circuit configured to convert an analog temperature signal into a digital temperature signal, the analog temperature signal being output from the temperature sensor, and a wireless communication module mounted on the conversion substrate and configured to transmit the digital temperature signal as a wireless signal, the wireless communication board being arranged away from the temperature sensor and located at a side of the temperature sensor, the side being opposite to a side where the rotating body is arranged; a battery arranged between the temperature sensor and the wireless communication board and configured to supply electric power to the wireless communication board; and a housing accommodating the temperature sensor, the wireless communication board, and the battery and attached to the box, the wireless communication board being arranged along a tangential direction of the rotating body, the temperature sensor, the battery, and the wireless communication board being arranged so as to overlap one another when viewed from a normal direction of the wireless communication board.

According to the above configuration, since the plate-shaped wireless communication board is arranged along the tangential direction of the rotating body (for example, a bearing), the amount of projection of the wireless communication function-equipped temperature sensor unit from the box can be reduced. In addition, since the battery is arranged between the temperature sensor and the wireless communication board, and the temperature sensor, the battery, and the wireless communication board overlap one another when viewed from the normal direction of the wireless communication board, the installation area of the wireless communication function-equipped temperature sensor unit can also be reduced. Therefore, deterioration of the degree of freedom of the attachment of the wireless communication function-equipped temperature sensor unit to the box can be suppressed while preventing the wireless communication function-equipped temperature sensor unit from being damaged by flying stones and the like.

Advantageous Effects of Invention

According to the present invention, in the wireless communication function-equipped temperature sensor unit attached to the box accommodating the rotating body of the railcar bogie, the deterioration of the degree of freedom of the attachment of the wireless communication function-equipped temperature sensor unit to the box can be suppressed while preventing the wireless communication function-equipped temperature sensor unit from being damaged by flying stones and the like.

DESCRIPTION OF EMBODIMENTS

Hereinafter, an embodiment will be explained in reference to the drawings. In the following explanations, a direction in which a railcar travels and in which a carbody extends is defined as a car longitudinal direction, and a crosswise direction perpendicular to the car longitudinal direction is defined as a car width direction. The car longitudinal direction is also referred to as a forward/rearward direction, and the car width direction is also referred to as a leftward/rightward direction.

Figure 1:
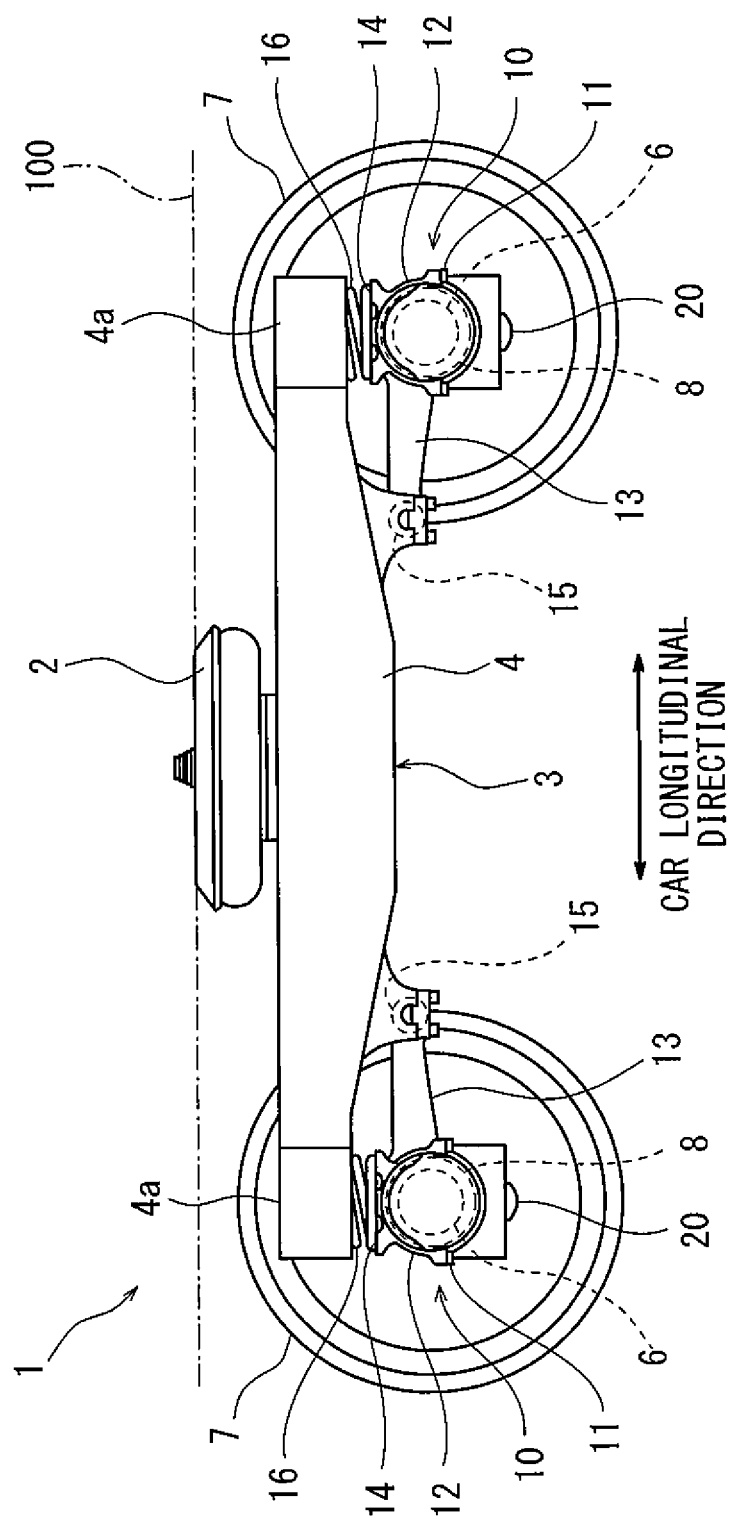
FIG. 1 is a side view of a railcar bogie according to an embodiment.

FIG. 1 is a side view of a railcar bogie 1 according to the embodiment. As shown in FIG. 1, the railcar bogie 1 includes a bogie frame 3 supporting a carbody 100 through air springs 2. The bogie frame 3 includes a pair of side sills 4 and a cross beam (not shown) and is formed in an H shape in plan view. The side sills 4 are located at both respective car width direction sides of the bogie frame 3 and extend in the car longitudinal direction. The cross beam couples the side sills 4 to each other and extends in the car width direction. Axles 6 extending in the car width direction are arranged at both respective car longitudinal direction sides of the bogie frame 3. Wheels 7 are fixed to both respective car width direction side portions of each of the axles 6. Bearings 8 rotatably supporting the axle 6 are provided at both respective car width direction end portions of the axle 6 so as to be located outside the respective wheels 7 in the car width direction. Each of the bearings 8 includes an inner ring (not shown), an outer ring 8a (see FIG. 2), and a rolling element (not shown) sandwiched between the inner ring and the outer ring 8a. The bearings 8 are accommodated in respective axle boxes 11 of axle box devices 10.

Each of the axle boxes 11 includes an axle box main body portion 12, an axle beam portion 13 (coupling portion), and a spring receiving portion 14. The axle box main body portion 12 accommodates the bearing 8. The axle beam portion 13 is coupled to the bogie frame 3. The axle beam portion 13 extends integrally from the axle box main body portion 12 toward a car longitudinal direction middle of the bogie 1 in the car longitudinal direction, and a tip end portion of the axle beam portion 13 is elastically coupled to the side sill 4 through a rubber bushing 15. The spring receiving portion 14 is provided at an upper portion of the axle box main body portion 12. A coil spring 16 configured to expand and contract in a vertical direction is interposed between a car longitudinal direction end portion 4a of the side sill 4 and the spring receiving portion 14 of the axle box 11. A wireless communication function-equipped temperature sensor unit 20 is attached to a lower portion of the axle box 11.

Figure 2:
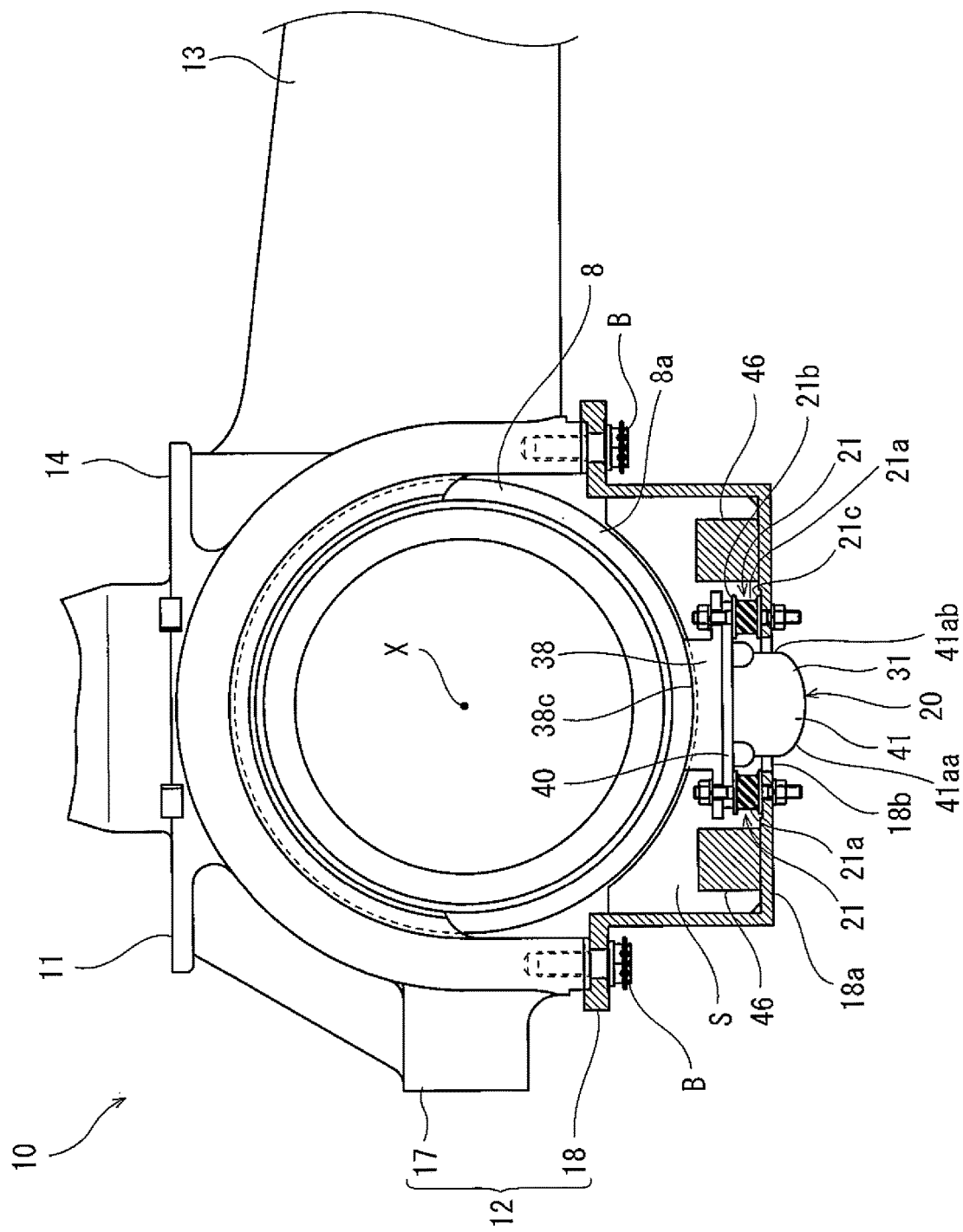
FIG. 2 is a partial sectional side view of an axle box device including a wireless communication function-equipped temperature sensor unit of the bogie shown in FIG. 1.

FIG. 2 is a partial sectional side view of the axle box device 10 of the bogie 1 shown in FIG. 1, the axle box device 10 including the wireless communication function-equipped temperature sensor unit 20. As shown in FIG. 2, the axle box device 10 includes the axle box 11, the wireless communication function-equipped temperature sensor unit 20, and a pair of elastic devices 21. The axle box 11 includes an upper axle box element 17 (first axle box element) and a lower axle box element 18 (second axle box element). The upper axle box element 17 covers an upper region (first region) of an outer peripheral surface of the outer ring 8a of the bearing 8, and the lower axle box element 18 covers a lower region (second region) of the outer peripheral surface of the outer ring 8a of the bearing 8.

The axle beam portion 13, the spring receiving portion 14, and a part of the axle box main body portion 12 are provided at the upper axle box element 17, and another part of the axle box main body portion 12 is provided at the lower axle box element 18. A surface of the upper axle box element 17 which surface covers the outer peripheral surface of the outer ring 8a of the bearing 8 is larger than a surface of the lower axle box element 18 which surface covers the outer peripheral surface of the outer ring 8a of the bearing 8. A lower end of the upper axle box element 17 is located lower than a rotation axis X of the bearing 8. The lower axle box element 18 is smaller in size in the vertical direction than the upper axle box element 17. The lower axle box element 18 is detachably attached to the upper axle box element 17 by bolts B from below.

The wireless communication function-equipped temperature sensor unit 20 is attached to the lower axle box element 18 to detect the temperature of the outer ring 8a of the bearing 8. A unit accommodating space S accommodating the wireless communication function-equipped temperature sensor unit 20 is formed between the outer peripheral surface (lower surface) of the outer ring 8a of the bearing 8 and the lower axle box element 18. In a state where the wireless communication function-equipped temperature sensor unit 20 is accommodated in the unit accommodating space S, the wireless communication function-equipped temperature sensor unit 20 projects downward beyond the lower axle box element 18 through an opening 18b formed at a bottom wall portion 18a of the lower axle box element 18. To be specific, a lower end portion of the wireless communication function-equipped temperature sensor unit 20 is located lower than the lower axle box element 18 and exposed to an outside of the axle box 11.

The wireless communication function-equipped temperature sensor unit 20 is attached to the lower axle box element 18 through the elastic devices 21. The elastic devices 21 are accommodated in the unit accommodating space S and are located at both respective sides of a cover 41. Each of the elastic devices 21 includes: an elastic body 21a; an upper fixture 21b provided at an upper surface of the elastic body 21a and made of metal; and a lower fixture 21c provided at a lower surface of the elastic body 21a and made of metal. The upper fixture 21b and the lower fixture 21c are displaceable relative to each other in the vertical direction and a horizontal direction by elastic deformation of the elastic body 21a. The elastic devices 21 bias the wireless communication function-equipped temperature sensor unit 20 such that: the elastic bodies 21a are provided in a compressed state in the vertical direction; and the wireless communication function-equipped temperature sensor unit 20 is pressed against the outer ring 8a toward the rotation axis X (center) of the bearing 8. The axle box 11 includes stopper portions 46 configured to restrict the displacement of the wireless communication function-equipped temperature sensor unit 20 around the rotation axis X to a predetermined range.

Figure 3:
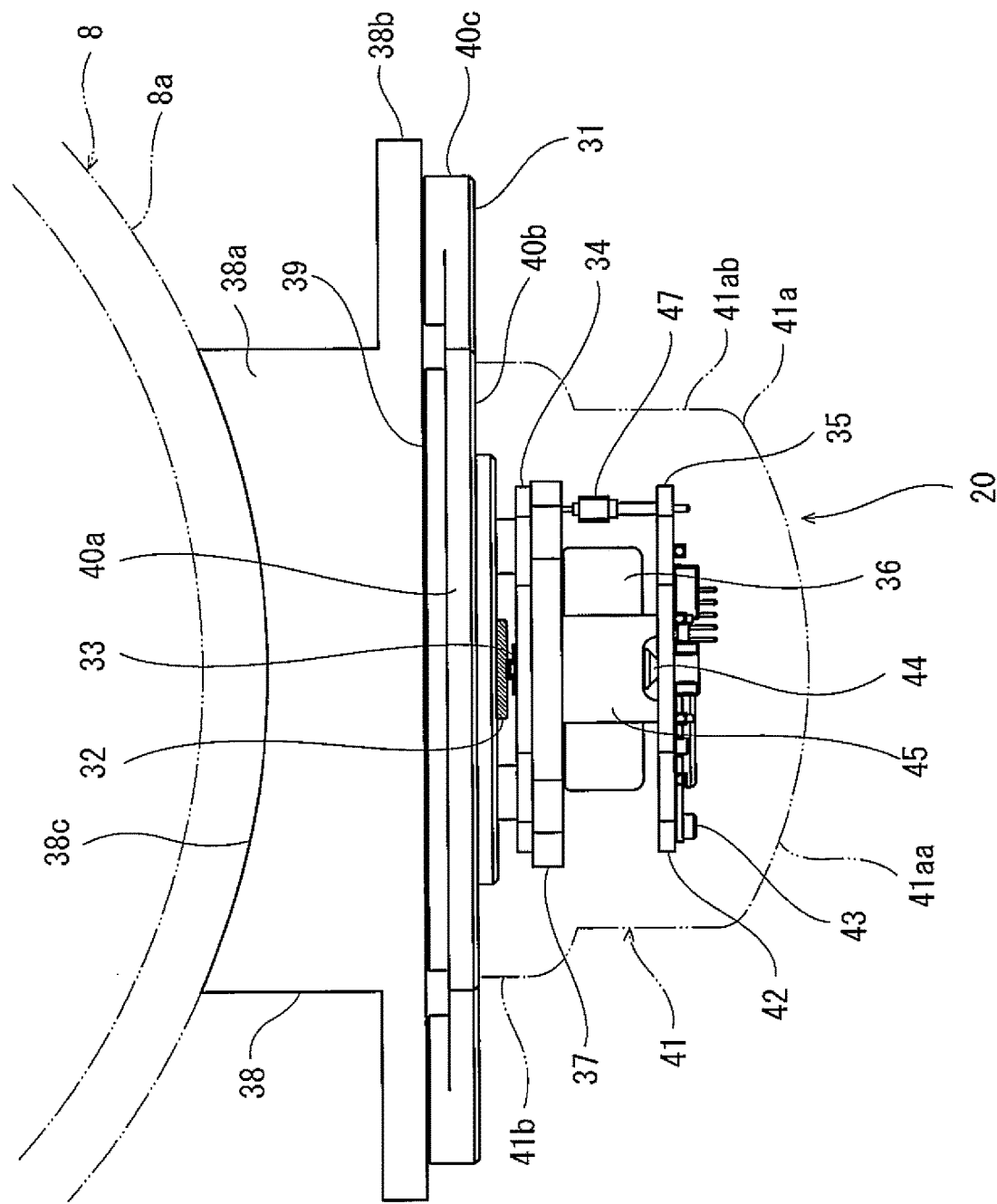
FIG. 3 is a side view showing a state where the wireless communication function-equipped temperature sensor unit of FIG. 2 is attached to an axle box.
Figure 4:
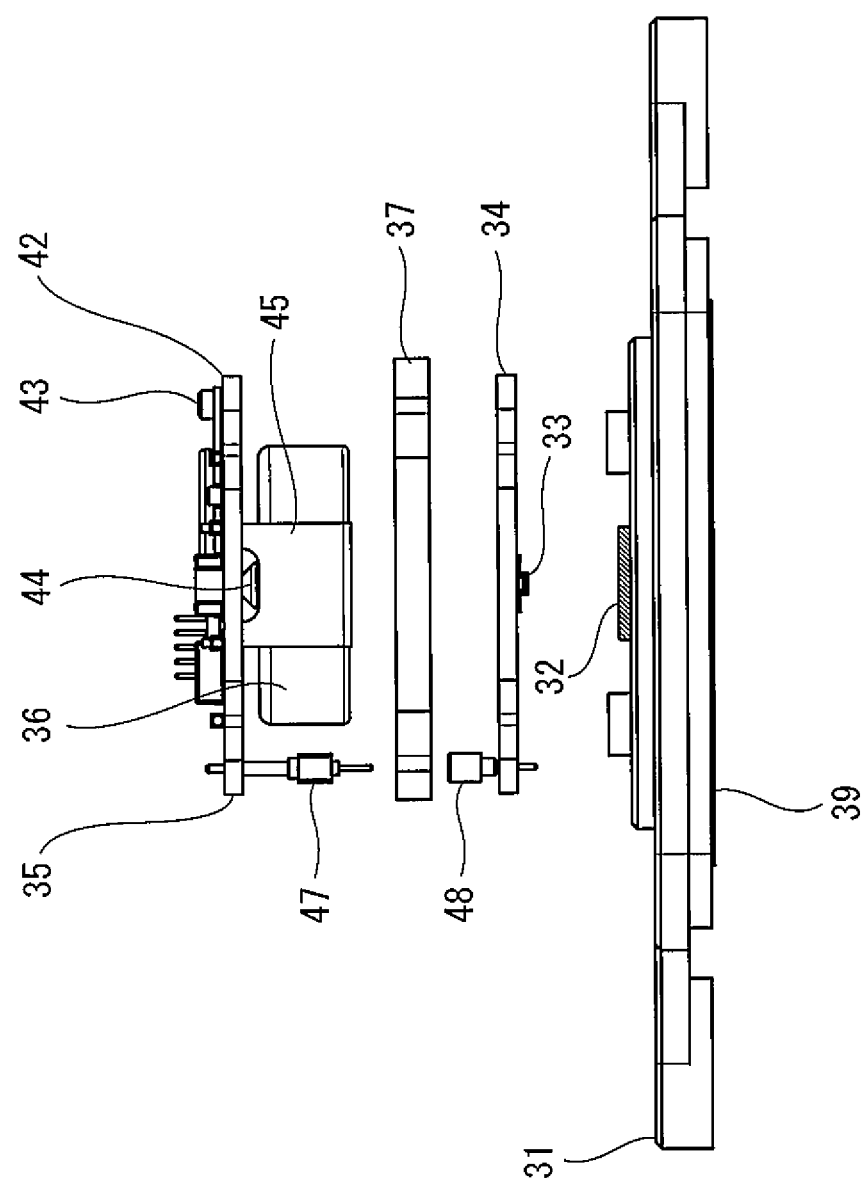
FIG. 4 is an exploded side view of the wireless communication function-equipped temperature sensor unit shown in FIG. 3.
Figure 5:
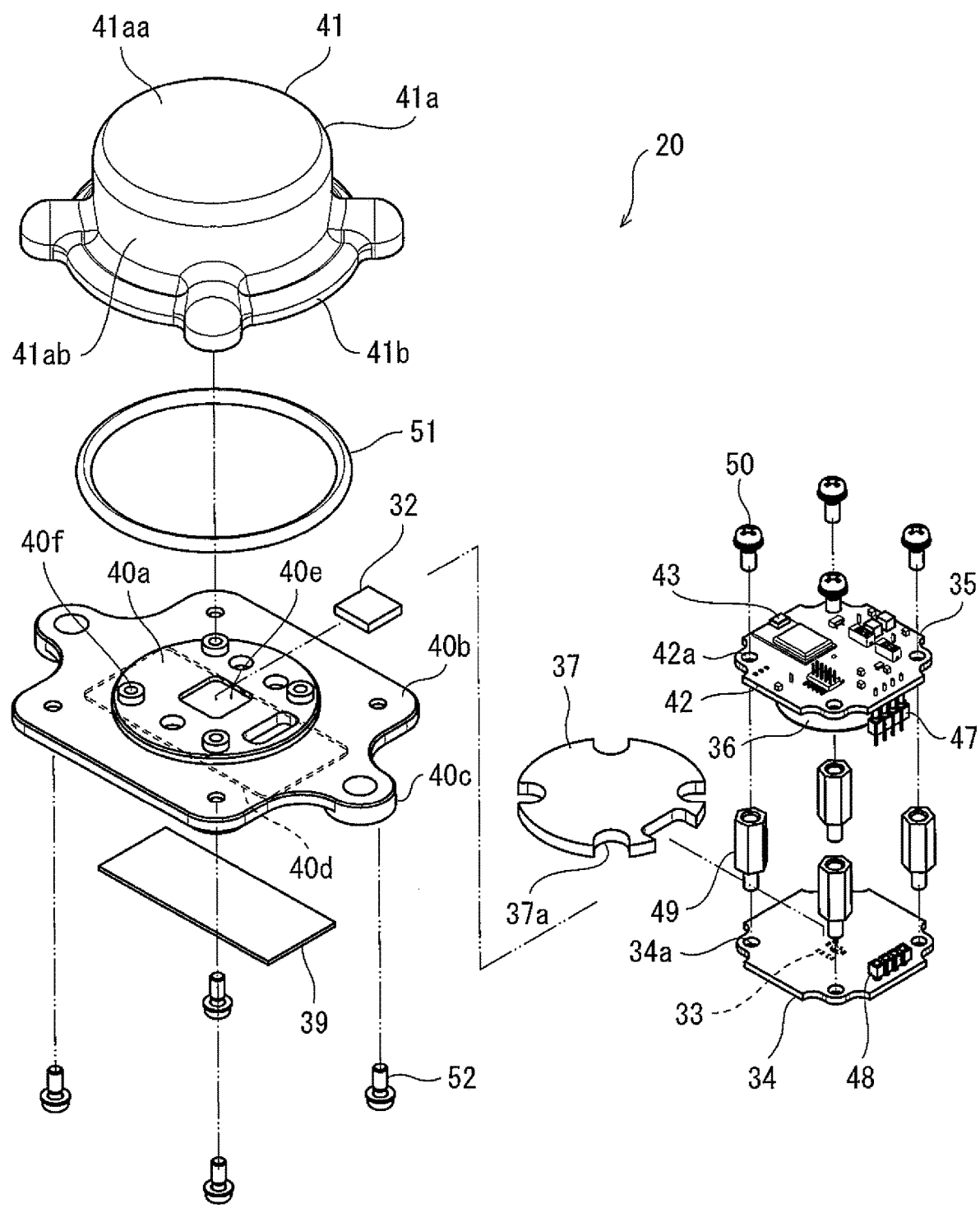
FIG. 5 is an exploded perspective view of the wireless communication function-equipped temperature sensor unit shown in FIG. 3.
Figure 6:
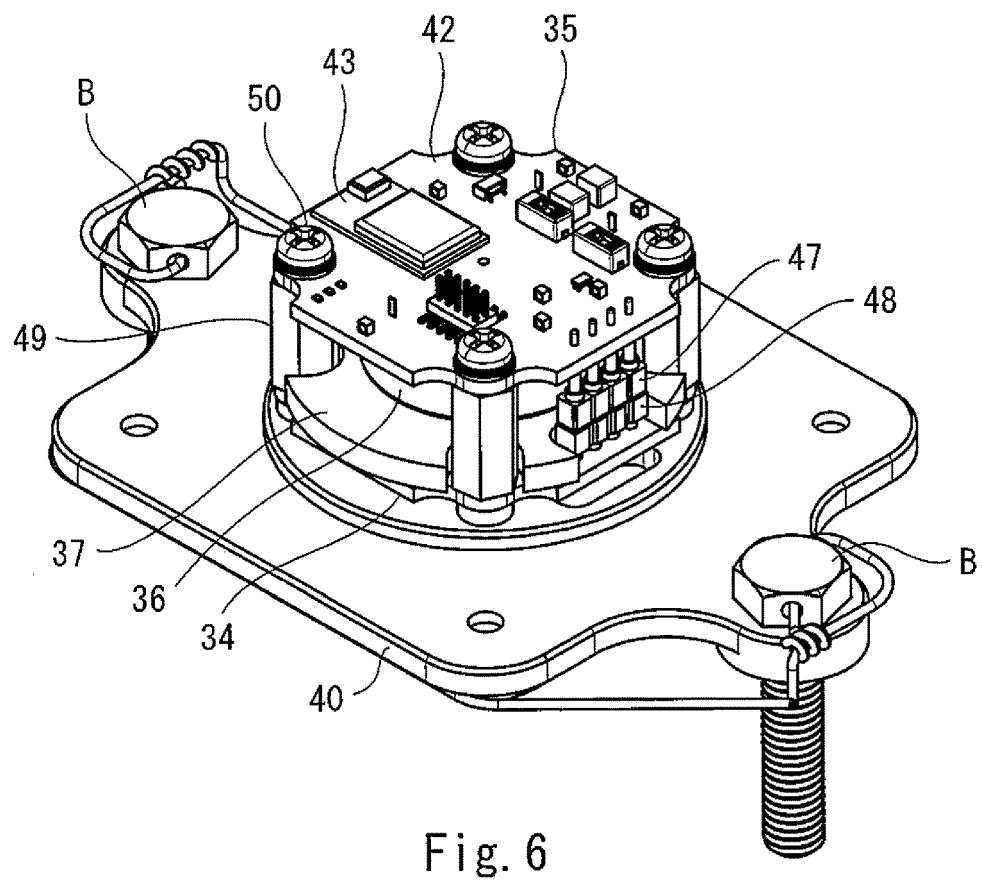
FIG. 6 is a perspective view showing a state where a cover of the wireless communication function-equipped temperature sensor unit shown in FIG. 3 is detached.
Figure 7:
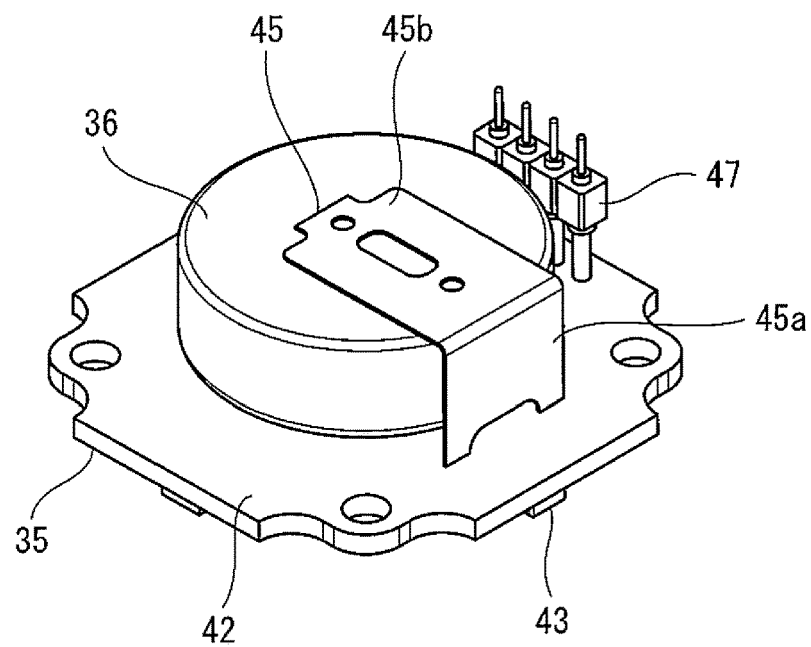
FIG. 7 is a perspective view of a wireless communication board and battery of the wireless communication function-equipped temperature sensor unit shown in FIG. 3.

FIG. 3 is a side view showing a state where the wireless communication function-equipped temperature sensor unit 20 of FIG. 2 is attached to the axle box 11. FIG. 4 is an exploded side view of the wireless communication function-equipped temperature sensor unit 20 shown in FIG. 3. FIG. 5 is an exploded perspective view of the wireless communication function-equipped temperature sensor unit 20 shown in FIG. 3. FIG. 6 is a perspective view showing a state where the cover 41 of the wireless communication function-equipped temperature sensor unit 20 shown in FIG. 3 is detached. FIG. 7 is a perspective view of a wireless communication board 35 and battery 36 of the wireless communication function-equipped temperature sensor unit 20 shown in FIG. 3. It should be noted that: FIGS. 4 to 6 are opposite to FIG. 3 in an upward/downward direction; and spacers 49 are not shown in FIGS. 3 and 4.

As shown in FIGS. 3 to 7, the wireless communication function-equipped temperature sensor unit 20 includes a housing 31, a thermal conduction sheet 32, a temperature sensor 33, a sensor substrate 34, a wireless communication board 35, a battery 36, a heat insulating member 37, and the spacers 49. The temperature sensor unit 20 has a temperature detection function, a wireless communication function, and a power supply function. The housing 31 is a casing accommodating the thermal conduction sheet 32, the temperature sensor 33, the sensor substrate 34, the wireless communication board 35, the battery 36, and the heat insulating member 37.

The housing 31 includes a contact member 38, a thermal conduction sheet 39, a base plate 40, and the cover 41. The contact member 38 and the base plate 40 are made of metal having thermal conductivity. For example, the contact member 38 and the base plate 40 are made of metal, such as an aluminum alloy, having high thermal conductivity. The thermal conduction sheet 39 is made of a material having elasticity and thermal conductivity, and for example, is made of thermally-conductive silicone rubber.

The cover 41 is made of an electrically-nonconductive material (for example, resin), and for example, is made of glass fiber-reinforced resin. Specifically, the cover 41 includes an accommodating portion 41a and a flange portion 41b. The accommodating portion 41a has a concave cross section, and the flange portion 41b projects from the accommodating portion 41a toward a lateral side. The accommodating portion 41a includes a bottom plate portion 41aa and a tubular side plate portion 41ab. The bottom plate portion 41aa has a dome shape expanding in a direction away from the base plate 40, and the tubular side plate portion 41ab extends from an outer peripheral edge of the bottom plate portion 41aa toward the flange portion 41b and is cylindrical. Metal nuts (not shown) with which screws 52 are threadedly engaged are embedded in the flange portion 41b.

The contact member 38 includes a heat receiving portion 38a and an axle box attachment portion 38b. The heat receiving portion 38a includes a circular-arc heat receiving surface 38c (upper surface) that is in surface contact with the outer peripheral surface of the outer ring 8a of the bearing 8. The axle box attachment portion 38b projects from the heat receiving portion 38a toward a lateral side. The thermal conduction sheet 39 is sandwiched in a compressed state between the contact member 38 and the base plate 40.

The base plate 40 includes a main body portion 40a, a cover attachment portion 40b provided around the main body portion 40a, and an axle box attachment portion 40c projecting from the cover attachment portion 40b toward a lateral side. The main body portion 40a is thicker than the cover attachment portion 40b. The main body portion 40a holds the thermal conduction sheet 32, the temperature sensor 33, the sensor substrate 34, the wireless communication board 35, the battery 36, and the heat insulating member 37. A concave portion 40d is formed on a surface of the base plate 40 which surface faces the thermal conduction sheet 39. The thermal conduction sheet 39 is positioned and accommodated in the concave portion 40d. The axle box attachment portion 38b of the contact member 38 and the axle box attachment portion 40c of the base plate 40 are attached to the lower axle box element 18 through the elastic devices 21. The cover 41 is attached to the cover attachment portion 40b of the base plate 40 by the screws 52. The cover 41 covers the thermal conduction sheet 32, the temperature sensor 33, the sensor substrate 34, the wireless communication board 35, the battery 36, and the heat insulating member 37 from below.

The thermal conduction sheet 32 has an electric insulation property and is sandwiched in a compressed state between the base plate 40 and the temperature sensor 33. To be specific, a detecting portion of the temperature sensor 33 is pressed against the thermal conduction sheet 32. A concave portion 40e is formed on a surface of the main body portion 40a of the base plate 40 which surface faces the temperature sensor 33. The thermal conduction sheet 32 is positioned and accommodated in the concave portion 40e. The thermal conduction sheet 32 is made of a material having the electric insulation property, the elasticity, and the thermal conductivity, and for example, is made of thermally-conductive silicone rubber. Heat of the outer ring 8a of the bearing 8 is transferred to the contact member 38, the thermal conduction sheet 39, the base plate 40, the thermal conduction sheet 32, and the temperature sensor 33 in this order.

The temperature sensor 33 is mounted on an upper surface of the sensor substrate 34. The sensor substrate 34 includes a sensor circuit configured to output an analog temperature signal, detected by the temperature sensor 33, to a below-described conversion substrate 42. The sensor substrate 34 and the wireless communication board 35 are arranged so as to face in the same direction. Specifically, the sensor substrate 34 and the wireless communication board 35 are arranged along a tangential direction of the outer peripheral surface of the outer ring 8a of the bearing 8. In other words, the sensor substrate 34 and the wireless communication board 35 are arranged in such postures that main surfaces thereof face the outer peripheral surface of the outer ring 8a of the bearing 8. The wireless communication board 35 includes the conversion substrate 42 and a wireless communication module 43. The conversion substrate 42 includes a conversion circuit configured to convert the analog temperature signal, output from the temperature sensor 33, into a digital temperature signal. When viewed from a normal direction of the wireless communication board 35, one of the conversion substrate 42 and the sensor substrate 34 has such a shape as to contain the other of the conversion substrate 42 and the sensor substrate 34. For example, a contour shape of the conversion substrate 42 and a contour shape of the sensor substrate 34 are the same as each other, and the conversion substrate 42 and the sensor substrate 34 are arranged such that those contours thereof coincide with each other when viewed from the normal direction of the wireless communication board 35. The conversion substrate 42 and the sensor substrate 34 are connected to each other through connectors 47 and 48 extending in the vertical direction. The wireless communication module 43 is mounted on the conversion substrate 42 and wirelessly transmits the digital temperature signal, output from the conversion substrate 42, to an outside of the wireless communication function-equipped temperature sensor unit 20 (for example, to a wireless receiver of the railcar).

The battery 36 supplies electric power to the temperature sensor 33, the sensor substrate 34, and the wireless communication board 35. A first electrode 44 and a second electrode 45 are provided on a surface of the conversion substrate 42 which surface is opposite to a surface on which the wireless communication module 43 is mounted. The first electrode 44 is one of positive and negative electrodes, and the second electrode 45 is the other of the positive and negative electrodes. A size of the battery 36 in a direction along the wireless communication board 35 is larger than a size of the battery 36 in a thickness direction of the wireless communication board 35. For example, the battery 36 is a button battery. The first electrode 44 contacts an electrode of one of surfaces of the battery 36, and the second electrode 45 contacts an electrode of the other surface of the battery 36. The second electrode 45 includes a vertical plate portion 45a and a horizontal plate portion 45b. The vertical plate portion 45a projects from the conversion substrate 42, and the horizontal plate portion 45b projects from the vertical plate portion 45a along the other surface of the battery 36. The battery 36 is sandwiched between the horizontal plate portion 45b of the second electrode 45 and the first electrode 44. To be specific, in the present embodiment, the second electrode 45 serves as a holder accommodating the battery 36.

Electric power from the battery 36 is supplied to the wireless communication board 35 through the first electrode 44 and the second electrode 45 and then supplied from the wireless communication board 35 to the sensor substrate 34 and the temperature sensor 33. The heat insulating member 37 is interposed between the sensor substrate 34 and the battery 36 and is larger in area than the battery 36. The spacers 49 are arranged between the sensor substrate 34 and the wireless communication board 35 and form a space between the sensor substrate 34 and the wireless communication board 35. The spacers 49 are made of an electrically nonconductive material (such as resin). Each of the spacers 49 is press fitted in and fixed to a hole 40f of the main body portion 40a of the base plate 40 through a hole 34a of the sensor substrate 34. A screw 50 is fixed to the spacer 49 through a hole 42a of the conversion substrate 42. Cutout portions 37a in which the respective spacers 49 are fitted are formed at an outer peripheral portion of the heat insulating member 37. The battery 36 and the heat insulating member 37 are arranged in the space formed by the spacers 49. The contact member 38, the thermal conduction sheet 39, the base plate 40, the thermal conduction sheet 32, the temperature sensor 33, the sensor substrate 34, the heat insulating member 37, the battery 36, and the wireless communication board 35 are arranged in the wireless communication function-equipped temperature sensor unit 20 in this order from an upper side to a lower side. To be specific, when viewed from the normal direction of the wireless communication board 35, the temperature sensor 33, the sensor substrate 34, the heat insulating member 37, the battery 36, and the wireless communication board 35 are arranged so as to overlap one another. The cover 41 is fixed to the base plate 40b in such a manner that the flange portion 41b is fastened to the cover attachment portion 40b of the base plate 40 by the screw 52 through a sealing member 51 (for example, an 0 ring). In this fixed state, the cover 41 is fitted to the thick main body portion 40a of the base plate 40 from an outside. In a state where the wireless communication function-equipped temperature sensor unit 20 is attached to the axle box 11, at least the bottom plate portion 41aa of the accommodating portion 41a of the cover 41 is exposed to an outside of the axle box 11 through the opening 18b. In the present embodiment, the bottom plate portion 41aa and a part of the side plate portion 41ab are exposed to the outside of the axle box 11 through the opening 18b.

According to the configuration explained above, since the plate-shaped wireless communication board 35 is arranged along the tangential direction of the bearing 8, the amount of projection of the wireless communication function-equipped temperature sensor unit 20 from the axle box 11 can be reduced. In addition, since the battery 36 is arranged between the temperature sensor 33 and the wireless communication board 35, and the temperature sensor 33, the battery 36, and the wireless communication board 35 overlap one another when viewed from the normal direction of the wireless communication board 35, the installation area of the wireless communication function-equipped temperature sensor unit 20 can also be reduced. Therefore, deterioration of the degree of freedom of the attachment of the wireless communication function-equipped temperature sensor unit 20 to the axle box 11 can be suppressed while preventing the wireless communication function-equipped temperature sensor unit 20 from being damaged by flying stones and the like.

Further, since the circular-arc heat receiving surface 38c of the contact member 38 is in surface contact with the outer peripheral surface of the outer ring 8a of the bearing 8, heat transfer from the outer ring 8a to the contact member 38 is stabilized, and this improves detection accuracy of the temperature sensor 33. Since the base plate 40 is made of metal, and the cover 41 is made of an electrically nonconductive material, the protection of the components and the securement of the stability of the wireless communication can be realized by the cover 41 while securing the thermal conductivity and the rigidity by the base plate 40. Since the thermal conduction sheet 32 having the electric insulation property is sandwiched between the base plate 40 and the temperature sensor 33, electric insulation between the metal base plate 40 and the temperature sensor 33 can be realized while satisfactorily transferring heat from the base plate 40 to the temperature sensor 33. Since the thermal conduction sheet 32 is accommodated in the concave portion 40e of the base plate 40, the increase in the size of the wireless communication function-equipped temperature sensor unit 20 in the thickness direction of the base plate 40 can be suppressed. Since the thermal conduction sheet 32 is positioned in the concave portion 40e, the thermal conduction sheet 32 can be prevented from being displaced relative to the base plate 40 by vibrations of the bogie 1.

Since the sensor substrate 34 on which the temperature sensor 33 is mounted is arranged so as to face in the same direction as the wireless communication board 35, and the sensor substrate 34, the temperature sensor 33, the battery 36, and the wireless communication board 35 are arranged so as to overlap one another, this can contribute to the reduction in the amount of projection of the wireless communication function-equipped temperature sensor unit 20 and the reduction in the installation area of the wireless communication function-equipped temperature sensor unit 20. Since the battery 36 is accommodated in the space formed by the spacers 49 so as to be sandwiched between the first electrode 44 and the second electrode 45 (holder) provided at the wireless communication board 35, various components such as the battery 36 can be compactly arranged while suppressing a temperature increase. Since the size of the battery 36 in the direction along the wireless communication board 35 is larger than the size of the battery 36 in the thickness direction of the wireless communication board 35, this can contribute to the reduction in the amount of projection of the wireless communication function-equipped temperature sensor unit 20 and the reduction in the installation area of the wireless communication function-equipped temperature sensor unit 20.

The bottom plate portion 41aa of the accommodating portion 41a of the cover 41 has a dome shape. Therefore, even when obstacles such as flying stones hit the bottom plate portion 41aa of the cover 41, the cover 41 can fend off the obstacles. Thus, the cover 41 can be suitably prevented from being damaged. Further, the side plate portion 41ab of the accommodating portion 41a of the cover 41 is cylindrical. Therefore, when the side plate portion 41ab is also exposed from the axle box 11, the cover 41 can be further suitably prevented from being damaged.

The present invention is not limited to the above embodiment, and modifications, additions, and eliminations may be made with respect to the configuration of the present invention. For example, the thermal conduction sheet 39 between the contact member 38 and the base plate 40 may be omitted, and the contact member 38 may be formed integrally with the base plate 40. To be specific, the base plate may be provided with a heat receiving surface that is in surface contact with the outer ring 8a. The battery 36 may not be attached to the wireless communication board 35 and may be attached to the sensor substrate 34. The heat insulating member 37 may be omitted. The wireless communication function-equipped temperature sensor unit 20 may be attached to a gear box or motor of the bogie 1.

REFERENCE SIGNS LIST

1 bogie
6 axle
8 bearing (rotating body)
8a outer ring
11 axle box
20 wireless communication function-equipped temperature sensor unit
31 housing
32 thermal conduction sheet
33 temperature sensor
34 sensor substrate
35 wireless communication board
36 battery
38c heat receiving surface
40 base plate
40e concave portion
41 cover
42 conversion substrate
43 wireless communication module
44 first electrode
45 second electrode (holder)
49 spacer

The invention claimed is:

1. A wireless communication function-equipped temperature sensor unit attached to a box accommodating a rotating body of a railcar bogie, the wireless communication function-equipped temperature sensor unit comprising:
   a temperature sensor;
   a wireless communication board including
      a conversion substrate including a conversion circuit configured to convert an analog temperature signal into a digital temperature signal, the analog temperature signal being output from the temperature sensor, and
      a wireless communication module mounted on the conversion substrate and configured to transmit the digital temperature signal as a wireless signal,
      the wireless communication board being arranged away from the temperature sensor and located at a side of the temperature sensor, the side being opposite to a side where the rotating body is arranged;
   a battery arranged between the temperature sensor and the wireless communication board and configured to supply electric power to the wireless communication board; and
   a housing accommodating the temperature sensor, the wireless communication board, and the battery and attached to the box,
   the wireless communication board being arranged along a tangential direction of the rotating body, with the proviso that a main surface of the wireless communication board faces an outer peripheral surface of the rotating body,
   the temperature sensor, the battery, and the wireless communication board being arranged so as to overlap one another when viewed from a normal direction of the wireless communication board.

2. The wireless communication function-equipped temperature sensor unit according to claim 1, wherein the housing includes:
   a base plate attached to the box and configured to transfer heat to the temperature sensor, the base plate being made of metal; and
   a cover attached to the base plate and covering the temperature sensor, the wireless communication board, and the battery, the cover being made of an electrically nonconductive material.

3. The wireless communication function-equipped temperature sensor unit according to claim 2, further comprising a thermal conduction sheet sandwiched between the base plate and the temperature sensor and having an electric insulation property.

4. The wireless communication function-equipped temperature sensor unit according to claim 3, wherein the base plate includes a concave portion accommodating the thermal conduction sheet, the concave portion being located on a surface of the base plate, the surface facing the temperature sensor.

5. A wireless communication function-equipped temperature sensor unit attached to a box accommodating a rotating body of a railcar bogie, the wireless communication function-equipped temperature sensor unit comprising:
   a temperature sensor;
   a wireless communication board including
      a conversion substrate including a conversion circuit configured to convert an analog temperature signal into a digital temperature signal, the analog temperature signal being output from the temperature sensor, and
      a wireless communication module mounted on the conversion substrate and configured to transmit the digital temperature signal as a wireless signal,
      the wireless communication board being arranged away from the temperature sensor and located at a side of the temperature sensor, the side being opposite to a side where the rotating body is arranged;
   a battery arranged between the temperature sensor and the wireless communication board and configured to supply electric power to the wireless communication board;
   a housing accommodating the temperature sensor, the wireless communication board, and the battery and attached to the box; and
   a sensor substrate on which the temperature sensor is mounted, the sensor substrate including a sensor circuit configured to output the analog temperature signal to the conversion circuit, wherein:
   the wireless communication board is arranged along a tangential direction of the rotating body;
   the temperature sensor, the battery, and the wireless communication board are arranged so as to overlap one another when viewed from a normal direction of the wireless communication board;

the sensor substrate is arranged between the temperature sensor and the battery so as to face in the same direction as the wireless communication board; and the temperature sensor, the sensor substrate, the battery, and the wireless communication board are arranged so as to overlap one another when viewed from the normal direction of the wireless communication board.

6. The wireless communication function-equipped temperature sensor unit according to claim 5, further comprising an electrically nonconductive spacer arranged between the sensor substrate and the wireless communication board, wherein the battery is provided in a space formed by the spacer and accommodated in a holder provided at the wireless communication board.

7. The wireless communication function-equipped temperature sensor unit according to claim 1, wherein a size of the battery in a direction along the wireless communication board is larger than a size of the battery in a thickness direction of the wireless communication board.

8. A wireless communication function-equipped temperature sensor unit attached to a box accommodating a rotating body of a railcar bogie, the wireless communication function-equipped temperature sensor unit comprising:

a temperature sensor;

a wireless communication board including a conversion substrate including a conversion circuit configured to convert an analog temperature signal into a digital temperature signal, the analog temperature signal being output from the temperature sensor, and a wireless communication module mounted on the conversion substrate and configured to transmit the digital temperature signal as a wireless signal, the wireless communication board being arranged away from the temperature sensor and located at a side of the temperature sensor, the side being opposite to a side where the rotating body is arranged;

a battery arranged between the temperature sensor and the wireless communication board and configured to supply electric power to the wireless communication board; and a housing accommodating the temperature sensor, the wireless communication board, and the battery and attached to the box, wherein:

the wireless communication board is arranged along a tangential direction of the rotating body;

the temperature sensor, the battery, and the wireless communication board are arranged so as to overlap one another when viewed from a normal direction of the wireless communication board;

the rotating body is a bearing supporting an axle;

the box is an axle box accommodating the bearing; and the housing includes a circular-arc heat receiving surface configured to transfer heat to the temperature sensor, the circular-arc heat receiving surface being in surface contact with an outer peripheral surface of an outer ring of the bearing.

9. The wireless communication function-equipped temperature sensor unit according to claim 1, wherein:

the housing includes a contact member; and the contact member is in surface contact with the outer peripheral surface of the rotating body and is configured to transfer heat to the temperature sensor.

10. The wireless communication function-equipped temperature sensor unit according to claim 9, wherein the contact member includes a circular-arc heat receiving surface which is in surface contact with the outer peripheral surface of the rotating body.

* * * * *